United States Patent [19]
Ashton et al.

[11] 3,970,495
[45] July 20, 1976

[54] METHOD OF MAKING A TUBULAR SHAFT OF HELICALLY WOUND FILAMENTS

[75] Inventors: Larry J. Ashton, Long Beach; Dale P. Abildskov, San Pedro, both of Calif.

[73] Assignee: Fiber Science, Inc., Gardena, Calif.

[22] Filed: July 24, 1974

[21] Appl. No.: 491,302

[52] U.S. Cl. ............................ 156/162; 156/175; 156/252; 156/285; 156/425; 156/433; 156/441; 138/144; 428/36; 428/222
[51] Int. Cl.² ................ B32B 31/18; B65H 81/00; B29C 17/04; F16L 9/16
[58] Field of Search ........... 156/173, 175, 189, 191, 156/193, 195, 285, 252, 433, 441, 162, 425; 428/36, 282; 138/144

[56] References Cited
UNITED STATES PATENTS

| | | | |
|---|---|---|---|
| 2,744,043 | 5/1956 | Ramberg | 156/173 X |
| 2,837,456 | 6/1958 | Parilla | 156/173 X |
| 2,843,153 | 7/1958 | Young | 156/175 X |
| 3,033,730 | 5/1962 | Martin | 156/175 X |
| 3,112,895 | 12/1963 | Kinney | 156/189 X |
| 3,177,105 | 4/1965 | Wiltshire | 156/285 X |
| 3,202,560 | 8/1965 | Michael | 156/194 X |
| 3,616,063 | 10/1971 | Bradley | 156/425 |
| 3,751,004 | 8/1973 | Quirk | 156/173 X |
| 3,772,115 | 11/1973 | Carison et al. | 156/189 X |

*Primary Examiner*—Philip Dier
*Attorney, Agent, or Firm*—Fulwider, Patton, Rieber, Lee & Utecht

[57] ABSTRACT

A tubular member which is ideally suited as a drive shaft for transmitting power from an engine to a remote station such as the drive shaft for a helicopter tail rotor or a remotely mounted propeller or rotor and a method of fabricating said member. The tubular member has a cylindrical body portion and at least one conical end portion with an integral, radial flange upstanding therefrom. The wall of the tubular member is composed of a plastic having embedded therein at least one layer of continuous filaments of fibrous reinforcing material with each layer of such material comprising two adjacent thicknesses of filaments. The filaments are in parallel alignment in each thickness and in diagonal orientation between thicknesses at a first helix angle in the cylindrical body portion and at a second, greater helix angle, in the conical end portion. The radial flange at the end of the tubular member is useful for interconnecting the tubular members to one another and/or to a power source such as an engine or to a working member such as a propeller.

12 Claims, 5 Drawing Figures

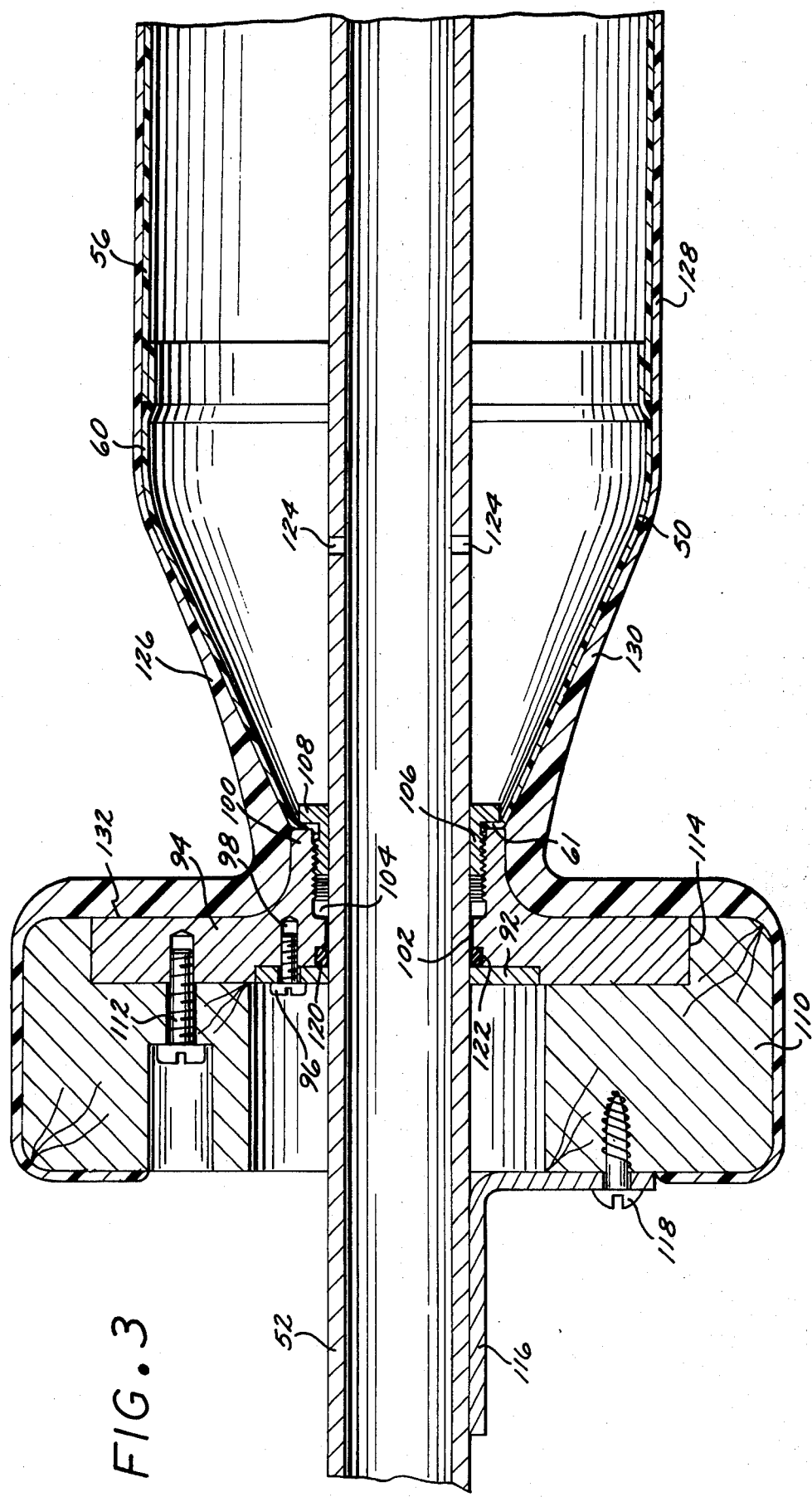

METHOD OF MAKING A TUBULAR SHAFT OF HELICALLY WOUND FILAMENTS

BACKGROUND OF THE INVENTION

1. Field of Invention

This invention relates to tubular shaft members and in particular, relates to tubular members having high stiffness to weight ratios which are ideally suited for power transmission in aircraft such as the drive shaft for a helicopter tail rotor or a remotely mounted propeller.

2. Description of the Prior Art

A number of aircraft have been developed which require the transmission of power from an aircraft engine to a remotely driven member such as the tail rotor of an aircraft or a remotely mounted propeller driven from a midship mounted engine. In such installations it is necessary to achieve minimum weight of the shaft and bearing supports while maintaining sufficient strength and stiffness in the tubular drive member to resist torsional and lateral oscillations. The problem is particularly acute in drive shafts for the helicopter tail rotors which are separated from the drive engine by a substantial length of fuselage which flexes during normal maneuvers of the helicopter or in helicopters having tandem, dual rotors which are driven through drive shafts which extend from a centrally located engine station.

Heretofore, the drive shafts employed for such aircraft installations have been fabricated of tubular metal members which bear radial end flanges for their interconnections to each other and to the engine drive or working member such as the tail rotor. Typically, the end flanges are approximately the same diameter as the tubular section of the member and are carried at the ends of the frustoconical sections which provide access to the radial faces of the flanges for mounting interconnecting fasteners between adjoining flanges. The radial end flanges are connected at bearing stations to a flexible coupling that generally comprises a series of stacked plates which permit some flexing between the coupling member and the tubular shaft member. The bearing stations are required to permit a limited amount of flexing of the tubular drive shaft to accommodate flexing of the supporting fuselage and to permit joining of the tubular sections which are limited in length to avoid development of resonating oscillations at critical natural frequencies in the tubular shaft members. It is desirable to minimize the number of the bearing stations in any installation because of the associated weight of the components of the bearing station. Since most metals have approximately equal stiffness to weight ratios, the distance between bearing stations for metalic tubular members is generally only a function of the diameter of the tubular members and is independent of the metal identity. It is, therefore, desirable to employ tubular members as drive shaft components which are formed of materials having stiffness to weight ratios superior to those of metallic members.

With many helicopter applications, particularly for military aircraft, the metallic drive shaft members are susceptible to catastrophic failure from relatively minor damage. Metallic members, when subjected to torsional stress, are highly notch sensitive so that if struck by a bullet or other fragment, the entire member will fail, resulting in loss of the aircraft. It is therefore desirable to provide a drive shaft formed of a material which is less stress tear sensitive than metallic members.

BRIEF DESCRIPTION OF THE INVENTION

This invention provides tubular members which are ideally suited for use as drive shafts in aircraft applications. These members have stiffness to weight characteristics superior to those of metallic members. The members also have superior resistance to stress tearing than do metallic members. The tubular members of this invention are formed by a continuous filament winding of fibrous reinforcing material, typically of fiberglass or graphite fibers and the like. The tubular members are formed with frusto-conical end portions which terminate in radial flanges which bear means for interconnection of the tubular members or for their connection to a power source or working member. The filaments of the fibrous reinforcement material are wound on a mandrel which is formed of a tubular center section by a flexible membrane that extends between opposite frustoconical end sections which bear end return rings for the winding process. The mandrel is inflated with a positive differential fluid pressure to maintain its shape during the winding process. The filaments are applied on the mandrel at helix angles over the frusto-conical sections which are greater than the helix angles on the center tubular section whereby the filaments follow the general contour of the winding mandrel. The filaments in the resultant sheathing are embedded with a bonding resin, typically an epoxide or a polyester resin, and the mandrel with its sheathing is placed in a mold and inflated with a positive differential fluid pressure to expand the sheathing outwardly into contour conforming contact with the die faces of the mold. The bonding resin is thereupon cured to cement the sheathing into a rigid tubular member which has a stiffness to weight ratio superior to that of metallic members. The ends of the sheathing which are wrapped about the end return rings are then cut about the periphery of the ring to form radial, circular flanges at the ends of the tubular members.

In a preferred embodiment of the invention, the inboard faces of the return ring members have a raised pattern surface to impart a relieved pattern of predetermined shape and dimensions to the radial flange of the tubular member whereby the flanges can be readily interconnected in torsional engagement. In the preferred embodiments, the frusto-conical end sections of the winding member are formed of a thermoplastic material whereby these end sections and the associated flexible tubular section of the winding mandrel can be deformed and withdrawn from the tubular member after its fabrication.

In other embodiments, the winding mandrel can be formed of a destructible material such as a water disintegratable material, a low melting point metal alloy or plaster.

BRIEF DESCRIPTION OF THE DRAWINGS

The invention will now be described by reference to the drawings of which:

FIG. 3 is a partial sectional view of the winding mandrel and a typical sheathing formed thereon;

DESCRIPTION OF THE PREFERRED EMBODIMENTS

Figure 1:
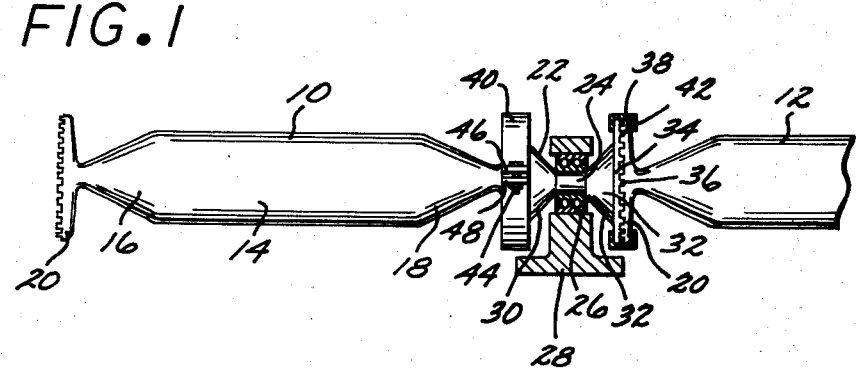
FIG. 1 illustrates a portion of a typical drive shaft formed with the tubular members of the invention.

Referring now to FIG. 1, there is illustrated an assembly of tubular members 10 and 12 of the invention. Each tubular member is formed with a center cylindrical section 14 and opposite frusto-conical end sections 16 and 18, each of which bears radial ring flanges 20.

Tubular members 10 and 12 are illustrated as joined by a bushing member 22 which has a center, cylindrical sleeve portion 24 that is mounted in the bearing 26 of a conventional pillow block bearing member 28. The opposite ends of sleeve 24 are connected to frusto-conical end sections 30 and 32 which bear radial ring flanges such as 34. The flanges 34 of the sleeve member 24 are interconnected to flanges 20 of the tubular members by suitable fastening and joint means. As illustrated, each of the mating faces of flanges 34 and 20 bear mating patterns 36 which are surface relieved thereon. As illustrated, pattern 36 can comprise a plurality of radially disposed teeth 38 on each of the flanges 20 and 34 which intermesh when the flanges are butted together in the illustrated manner. The joint is completed by a suitable clamping means such as the band clamp 40 which has annular lips 42 at either side thereof to engage about the peripheral portions of the flanges. The clamp 40 is secured by a suitable fastener such as 44 which extends through ends 46 and 48 of band 40. Other suitable means can be employed for effecting the interconnection of flanges 20 and 34, e.g., conventional bolt fasteners, rivets and the like could be placed through the butting surfaces of these flanges to effect such interconnection.

One of the advantages of the tubular members of the invention, which are formed by continuous filament winding of fibrous reinforcement material, is that the flanges 20 are resiliently carried on the ends of frusto-conical sections 16 and 18. The flexibility of these flanges on the tubular members is sufficient such that in most installations the conventional flexible coupling of stacked plate members necessary for interconnection of metallic tubular members is not required. Instead, the tubular shaft members of this invention provide a limited flexing between bearing stations which will be sufficient to accommodate the deflections normally experienced in a helicopter tail rotor installation.

Figure 2:
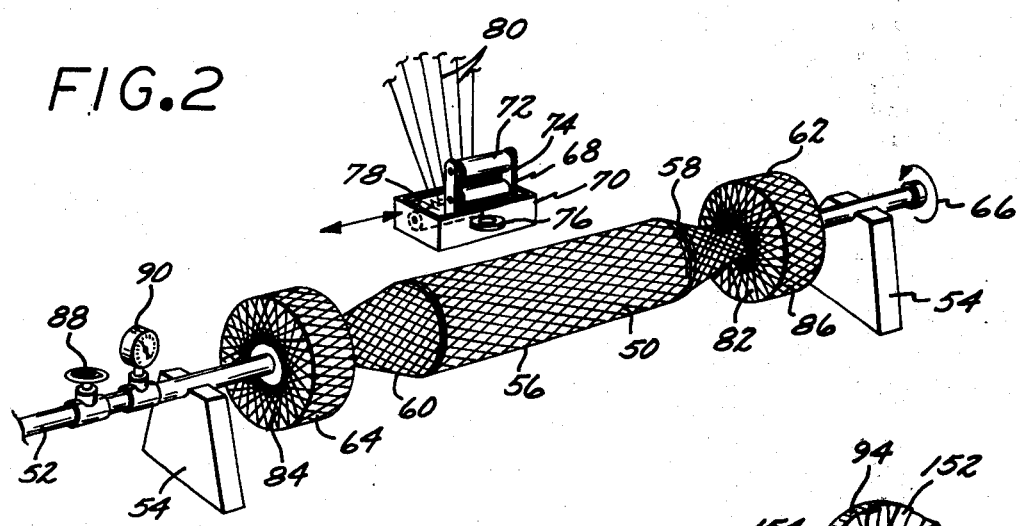
FIG. 2 illustrates the winding process for the manufacture of the tubular members of the drive shaft.

FIG. 2 illustrates the manufacture of the tubular sections in accordance with the invention. As previously mentioned, the tubular sections are formed by a continuous filament winding process using filaments of a fibrous reinforcement material. These filaments are wound about a mandrel of a desired configuration such as that shown in FIG. 2. The mandrel 50 is mounted on shaft means 52 which, as illustrated, can be a continuous shaft extending the length of the mandrel and resting on suitable bearing supports 54 or can be stub shafts supporting opposite ends of the mandrel 50. The mandrel 50 is formed with a generally cylindrical center section 56 and opposite, frusto-conical end sections 58 and 60. The small diameter end of sections 58 and 60 bear circular end plates 62 and 64 which serve as end return members for the winding process. Shaft 52 is mounted for a driven, rotational movement as indicated by arrow 66.

The continuous filament winding apparatus employed includes a reciprocally driven carriage generally indicated at 68 which comprises a vessel 70 bearing a plurality of tensioning rollers 72 carried on standards 74. The winding apparatus also includes guide ring 76 which, together with carriage 68, is adapted for reciprocal driven movement parallel to the axis of rotation of mandrel 50.

The vessel 70 contains a bath of the bonding resin indicated at 78 and the filaments 80 of the fibrous reinforcement material are guided into the bath, over the tensioning rollers 72, through guide ring 76 and then applied to the mandrel 50 in a predetermined pattern.

The filaments 80 are applied to mandrel 50 in a helical path thereon by guiding the filaments in a mandrel end-to-end traversing path as the mandrel is rotated to apply a plurality of layers of helically wound filaments on the mandrel with helix angles along the tubular cylindrical section 56 of from 5° to about 75° and, on the frusto-conical sections, at greater helix angles, typically from 45° to about 90°, which are sufficient to form the resulting sheathing about the mandrel in conformity to the frusto-conical end portions 60 and 58.

The desired relationship between the helix angle of the windings of the frusto-conical sections and the helix angle of the windings on the cylindrical section can be mathematically expressed. This relationship is as follows:

$$\alpha_n \geqq \sin^{-1}\left(\frac{R_o \sin\alpha_o}{R_n}\right)$$

wherein:
$\alpha_n$ is the helix angle at any given point along the frusto-conical section;
$\alpha_o$ is the helix angle along the cylindrical section;
$R_n$ is the radius of the given point about the mandrel centerline; and
$R_o$ is the radius of the cylindrical section about the mandrel centerline.

The filaments are deflected into geodesic paths in a spoke-like pattern in chordal paths about the inboard face such as 82 of each end return member 62 and 64. The filaments are applied to the cylindrical portions of the end return member 86 at helix angles similar to those used for the center cylindrical section 56. The filaments are then applied across the end faces such as 84 of the mandrel to reverse the windings for the return path of the carriage 68.

This winding process results in the application of layers of continuous filaments of the fibrous reinforcement material with each layer comprising two adjacent thicknesses of filaments, with the filaments being applied in parallel alignment in each thickness and in diagonal orientation between thicknesses at twice the value of the aforerecited helix angles.

Preferably center section 56 of the mandrel comprises a flexible member which is maintained in the desired configuration by a positive internal differential fluid pressure. Preferably gas pressure is maintained within the winding mandrel by a supply means such as hollow shaft 52 which is provided with suitable valve means 88 for controlling the gas pressure within the mandrel and suitable indicating means such as pressure gage 90 for registering the magnitude of the differential pressure maintained within the winding mandrel.

In another embodiment, mandrel 50 can be formed of a destructible material which can be formed after the resin has been cured. Examples of suitable destructible materials include sand and similar granular material which can be cast and bonded into the desired mandrel configuration using from 3 to about 10 weight percent of a water soluble resin such as a partially hydrolyzed polyvinyl acetate. After the resin has been cured, the mandrel can be removed by immersing the mandrel and surrounding tubular member in water. Another suitable material is plaster, e.g., plaster of Paris which can be broken from the interior of the tubular member after its cure hardening. Eutectic alloys can also be used, such as the commercially available Cerrobend products. These alloys can be obtained as lead and antimony alloys which have melting points from about 117° to about 480° F. and which comprise binary, ternary, quaternary and quinary eutectic alloys of lead, antimony, bismuth, cadmium and indium. An example of such is the quaternary alloy of bismuth, lead, antimony and cadmium having a melting point of 158° F. and commonly referred to as Wood's metal.

Referring now to FIG. 3, the constructional features of the winding mandrel and the sheathing formed thereon will be described. As shown in FIG. 3, shaft 52 supports each end of the winding mandrel. The winding mandrel is defined by the cylindrical center section 56 that is formed of a suitable flexible membrane and that is attached to the frusto-conical end sections such as 60. The small diameter end of the frusto-conical end section 60 bears an inwardly turned annular lip 61. Shaft 52 bears a ring retainer member 92 to which is mounted circular flange 94 by suitable means such as a plurality of bolt fasteners 96 which extend through radially disposed bores in ring 92 and into threaded engagement with tapped bores 98 of flange 94. Flange 94 bears an upstanding boss 100 on its inboard face which is bored at 102 and counterbored at 104. Counterbore 104 is threaded with female threads to receive a threaded plug member 106. Plug 106 has an annular flange 108 which bears against the peripheral lip 61 of frusto-conical member 60 whereby the latter member can be removably secure to flange 94.

Flange 94 also supports the end return ring member 110 which is a generally ring shaped member secured to the outboard face of flange 94 by suitable fastening means such as bolts 112 which are seated in radially disposed bores of ring 110 and which extend into threaded engagement with mating, tapped bores on the outboard face of flange 94. Return ring 110 and flange 94 are assembled in a manner providing a smooth transitional surface between these members. Accordingly, when the return ring 110 is of larger diameter than flange 94, the flange 94 can be countersunk into the mating surface of ring 110 by providing a circular depression 114 in the inboard surface of return ring 110.

The mandrel 50 can be secured in a rotationally driven interconnection to shaft 52 by suitable means such as bracket 116 that is rigidly secured to shaft 52 and that is removably secured to end return member 110 by suitable means such as screw 118 that extends through a bore in the radial portion of bracket 116.

The end return member 110 can be formed of any suitable material such as plastics, wood, metal and the like. Flange 94 can be constructed of similar material, however, this flange is preferably metallic. The frusto-conical members such as 60 are preferably formed of thermoplastics which can be readily molded into the frusto-conical shape and which can be removed from the completed tubular member in a manner hereinafter described. The tubular center section 56 of the mandrel is formed of a suitable flexible material such as a sheet or film of plastic material, e.g., polyethylene, polypropylene, polybutadiene and co-polymers thereof with acrylonitrile, styrene, etc. A convenient fabrication of the flexible cylindrical section 56 is achieved by thermal deformation of an extruded conduit of thermoplastic material by heating the conduit and applying a positive differential pressure to the interior thereof to expand the conduit into a larger diameter and thinner walled sheet such as 56.

As previously mentioned, the interior of the winding mandrel is maintained under a positive differential fluid pressure. Preferably gas pressure and, most preferably, compressed air is used which is introduced through the interior of shaft 52. The interior of the mandrel is sealed by suitable means such as by O-ring 120 which is mounted in annular groove 122 in the central bore of flange 94. Shaft 52, of course, is provided with suitable apertures or fluid passageways 124 along its length within the mandrel 50 whereby the gas pressure within shaft 52 can be applied to the interior of the mandrel. The amount of differential pressure applied to the interior of the mandrel can be from 0.5 to about 125 p.s.i. The pressure can be gradually increased as the winding progresses and in a typical application could be increased from about 0.5 p.s.i. initial to about 25 p.s.i. at the completion of the winding. The filaments are supplied from one or more rovings on spools or bobbins and are passed through one or more baths of liquid, such as that contained in vessel 70, and then through guide means 76 and onto the mandrel as the latter is rotated about its axis. The mandrel can be rotated at a speed from 1 to about 250, typically from 15 to about 50 revolutions per minute.

The filaments are applied at a predetermined tension typically from about 0.1 to 10, preferably from 0.5 to about 5 pounds per roving. This is accomplished by passing the filaments through tensioning means such as rollers 72. The carriage 68 is moved in a longitudinal direction in a mandrel traversing path as shown by the double-headed arrow. When the assembly reaches the end of the mandrel, its direction of movement is reversed to apply the remaining half layer of the filaments. The velocity of the carriage can be from about 0.5 to 5 feet per second, typically about 2 feet per second. This velocity is usually limited in a wet winding process by the tendency of the fiber to sling off the resin at higher velocities. When pre-preg or post-preg applications are used, i.e., when the resin is applied before or after the winding rather than onto the fiber, higher carriage speeds could, of course, be used. Sufficient resin can be wetted onto and retained on the surface of the filaments when the resin viscosity is maintained between about 1,000 and 6,000, preferably between about 2,000 and 3,000, centipoises, at the application temperature. Resins of greater viscosities at ambient temperature can be used simply by warming or heating the resin in vessel 70, care being taken, of course, to limit the residence time of the resin in the vessel to avoid initiating the cure hardening of the resin.

The outer sheathing formed of the fibrous reinforcement material which is wound in the aforedescribed pattern on the exterior of the mandrel and the bonding resin therefor is illustrated in FIG. 3 as layer 126. This layer is shown as having a relatively uniform thickness throughout portion 128 which overlies the cylindrical center section of the mandrel and an increasing thickness of the frusto-conical portion 130 which overlies the frusto-conical end former 60 and flange 94. The increased thickness, as shown, may not be necessary, depending on the type of interconnection which is made between the tubular members. Accordingly, this construction is an optional variation of the invention. The increasing thickness of the fibrous reinforcement material can be obtained in the continuous filament winding process, if desired, by applying sheets or strips of fabric of the fibrous reinforcement material during the winding process, such strips or sheets being applied between adjacent layers or thicknesses of the filaments of the fibrous reinforcement material. When the filleted area is increased in thickness, as illustrated, this increased thickness is also preferably extended across the inboard face 132 of flange 94 to provide a ring flange on the tubular member of reinforced thickness.

After the filaments have been applied onto the mandrel in the aforedescribed pattern and sufficient layers of such filaments have been applied to achieve the desired thickness of the continuous sheathing about the surface of the mandrel, the sheathing can be consolidated into a rigid and resilient tubular member. Generally from one to about 50, preferably three to about 10, and most preferably, about six or seven, layers of filaments are applied to the mandrel to achieve the maximum, desired stiffness to weight ratio of the final tubular member.

Figure 4:
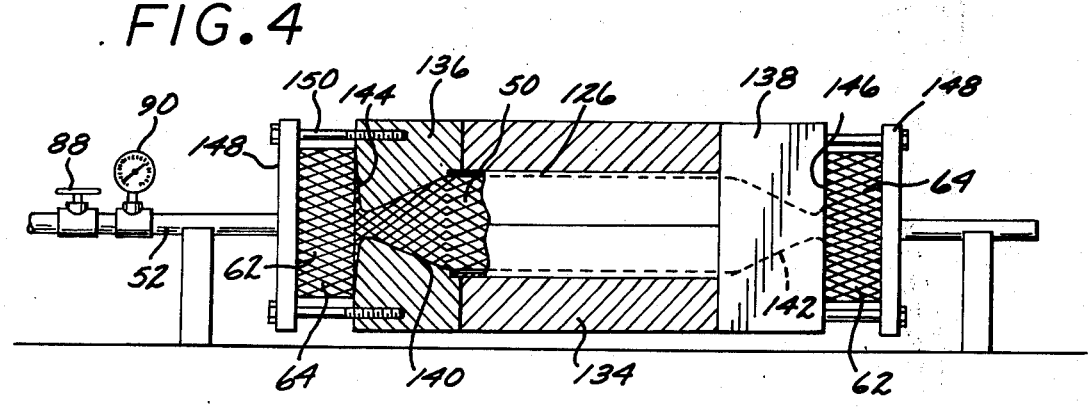
FIG. 4 illustrates the forming of the sheathing into a cured and rigid shaft tubular member.

As shown in FIG. 4, the assembly of the mandrel 50 and the sheathing 126 carried thereon is placed in a suitable die which is formed of a center split mold 134 which has a cylindrical mold cavity of the desired exterior dimension of the finished tubular member. The mold 134 is mated to end molds 136 and 138 at opposite ends thereof and these end molds have generally frusto-conical cavities 140 and 142 which impart the desired exterior configuration to the frusto-conical portion of the tubular member. Molds 136 and 138 are, as mold 134, formed of split halves which are joined along the centerline of the tubular member. The end molds are drawn into butting contact with the inboard faces 144 and 146 of the sheeting disposed on the mandrel return end members 62 and 64. This contacting of the molds in the fillets between the frusto-conical portions, and the inboard faces 144 and 146 can be facilitated by the use of end plates 148 which are provided with a number of radially disposed bores through which are extended fasteners such as bolts 150 that project into tapped bores in the upward faces of the molds 136 and 138.

The sheathing 126 on the exterior surface of the mandrel is expanded into contour conforming contact with the interior die faces of molds 134, 136 and 138 by the application of fluid pressure through valve 88 and shaft 52 in the previously described manner. The bonding resin is thereupon cured thermally or catalytically and to this end, various internal passages can be provided in molds 134, 136 and 138 through which a heat exchange medium can be circulated to heat the sheathing and its bonding resin to the requisite curing temperature. Suitable resin curing temperatures that can be used include temperatures from ambient, e.g., about 75°F, to about 400°F., preferably from 100° to 225°F. The application of this heat is continued for a sufficient time for resin curing, e.g., from 10 minutes to about 7 days, preferably from 60 to about 300 minutes as required for the particular resin and fibrous reinforcement system employed in the fabrication of the article.

After the resin has cured to a hardened condition, the molds 134, 136 and 138 can be opened and the formed tubular member can be removed therefrom. The sheathing about the return end pieces 62 and 64 can be cut about a peripheral portion thereof to form the generally circular flanges 20 on opposite ends of the tubular member.

The mandrel used in the fabrication of the tubular member is then disassembled. This disassembly is achieved by removing the return end members 62 and 64 and the associated flanges 94 from the assembly. As previously mentioned, the preferred material for use as the frusto-conical section of the mandrel is a thermoplastic. Accordingly, the tubing member, when in heated condition, can be freed from its internal mandrel by deforming the frusto-conical end portions and withdrawing them with the associated center flexible mandrel section 56 through the central aperture on the tubular member. To permit the facile removal of the mandrel from its outer tubular member, the mandrel should be coated with a suitable parting agent prior to application of the sheathing and bonding resin. Various parting agents can be employed for this purpose such as the conventional mold release agents for epoxies or polyester resins.

Figure 5:
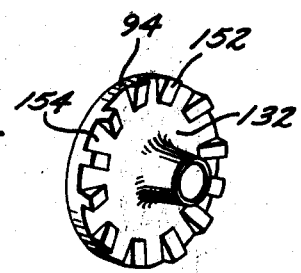
FIG. 5 illustrates a flange member useful to impart a desired mating pattern on an end flange of a tubular member.

As previously mentioned, the outboard faces of the cylindrical end flanges on opposite ends of the tubular portions can be formed with a suitable pattern of surface relief. An example of a suitable surface relief pattern comprises the radial teeth 34 which are shown in FIG. 1. Other configurations which can be employed would be to provide a scalloped or wavy shape to the outer surface of these ring members. FIG. 5 illustrates a suitable flange 94 which has an inboard face 132 that bears an intaglio pattern of the surface relief desired on the outboard ends of circular end flanges 20 of the tubular member. As illustrated, this pattern comprises regularly disposed and raised, generally wedged shaped teeth 152, which project from surface 132 of the flange. The spaces between these teeth 152 are undercut to provide an inclined and recessed surface 154 of the same dimensions as the raised surfaces 152, whereby mating patterns will be formed on surfaces that are formed against the inboard face 132 of flange 94.

The following illustrates a typical application of the invention and demonstrates the superiority of the tubular sections of the invention over conventional metal sections. The tubular sections are designed for installation as the drive shaft for a rotor of a military helicopter. The sheathing is formed with graphite filaments, coated with an epoxy resin and molded to prepare tubular members having an outside diameter of 4.25 inches. This diameter of tubular sections could be provided with lengths of 69 inches for the particular installation without exceeding the torsional and bending stresses encountered in the application. In contrast, a conventionally formed tubular member of aluminum had an outside diameter of 3 inches and maximum length of 57.5 inches. The invention can therefore be seen to have provided about 20% greater spacing between the necessary bearing supports for the tubular shaft assembly. Other installations have shown as great as about 50% increased spacing over metallic members between the bearing stations, thereby greatly reducing the weight of the assembled shaft and bearing supports.

SUITABLE FIBROUS MATERIALS

Any available fiber can be used as a reinforcement for resins used in the process. Examples of available fibers include fibers of rayon, cotton, silk, polyesters, etc. Most desirably, however, fibers are employed which have relatively high tensile strength such as glass, boron or graphite fibers, the latter being preferred for the excellent stiffness to weight ratios they achieve in the finished tubular member. Type S glass fibers can be used and are preferred for their greater strength over Type E glass fibers. Typically the Type S fibers have tensile strength from 3 to $7\times10^5$ p.s.i. and Young's Modulus of about 12 to $13\times10^6$ p.s.i. The Type S fibers are obtained from a glass melt of silica, alumina and magnesia.

In their manufacture, the glass filaments are usually sized immediately upon formation to avoid any mechanical damage. A textile sizing, which consists of a dextrinised starch and emulsified vegetable oil, is sometimes applied. More commonly, a plastics sizing is applied which comprises a polyvinyl acetate base, a plasticizer and a resin coupling agent. When the textile sizing is present, it is necessary to remove the sizing from the filaments before their application since the textile sizing is generally not compatible with the bonding resins. When the plastics sizing is employed, the filaments can be directly applied and embedded with the bonding resin since they are compatible with the commonly used bonding resins.

When necessary, the yarn can be de-sized by carmelization which comprises a heat treatment to volatilize the sizing and carbonize the starch, thereby reducing the residual sizing content to about 0.6%. The sizing can also be removed by passing the filaments through a scouring bath to remove the organic material and reduce the residual sizing to below 0.3%. A combination of both treatments can also be used where the filaments are passed through the aqueous bath and then passed through an oven at a temperature of about 300° – 350° C.

The filaments of glass fibers have diameters which range from about 0.0045 to about 0.015 millimeters in diameter. As described herein, the term filaments has been used generally to refer to a single filament or to yarns or rovings of a plurality of filaments. The filaments can be used as yarns which are formed from a plurality of filament strands by twisting and plying the strands, or as rovings which are bands of untwisted strands. The latter are preferred. The yarn is commonly designated by count which is the weight of the yarn per unit length and typical yarn counts are from 2.75 to 135 grams per kilometer of yarn length. The number of filaments which are combined into a strand of yarn or into a roving range from about 50 to about 250 filaments. The yarns or rovings are supplied on a spool or bobbin with from 1 to about 300 ends which are wound into a cheese or cone shape. The rovings unwind during their application as a band of parallel, multiple filaments which are applied to the mandrel as a band.

Carbon base fibers can also be employed and are preferred because of the high strength and stiffness which they impart to the tubular members. The carbon base fibers are prepared from filaments of carbonaceous materials which are heated to high temperatures under carefully controlled conditions to convert the carbonaceous material into substantially pure carbon. Rayon is one of the most commonly used carbonaceous material for preparation of the carbon and graphite fibers. The fibers are commonly referred to as partially carbonized, carbonized or graphitized, depending upon the severity of the heat treatment. The partially carbonized fibers are obtained by treatment of fibers at temperatures from 1300° to 1700° F. and have a carbon content up to about 90 weight percent. Fibers having carbon contents above 90 weight percent are obtained by carbonization at slightly higher temperatures and are generally referred to as carbonized fibers, while fibers which have been heated to graphitizing temperatures, i.e., temperatures from 4900° to 5400° F. are referred to as graphitized fibers. The commercially available carbon or graphite fibers have tensile strengths of about 1 to about $5\times10^5$ p.s.i. and Young's Modulus of 6 to $100\times10^6$ p.s.i. The fibers have densities of about 1.4 grams per cubic centimeters, although fibers having a high content of graphitic structure will have densities up to about 2 grams per cubic centimeter. The carbon base fibers are available as rovings similar to those described for the glass fibers.

The boron fibers are produced by drawing a tungsten wire having a diameter of about 0.5 mil through a reactor containing a boron-containing gas. The wire is electrically heated to a sufficient temperature to decompose the gas and deposit a coating of boron on the wire. Typically, the coated product has a diameter of about 0.003 to 0.005 inch.

The strength of the boron fibers is intermediate that of graphite and glass fibers. The following table lists typical strengths and densities of these fibers:

TABLE

| Material | Density lb/in$^3$ | Tensile psi$\times10^3$ | Modulus psi$\times10^6$ | Modulus density$\times10^6$ |
|---|---|---|---|---|
| Graphite | 0.05 | 400 | 50 | 910 |
| Boron | 0.09 | 500 | 60 | 666 |
| Type S glass | 0.09 | 650 | 12.5 | 174 |

As apparent from the last column of the preceding table, the maximum stiffness and strength per unit weight is achieved with the preferred graphite fibers followed by the boron fibers.

RESIN SYSTEMS

The resins that are commonly used in the manufacture of fiber-reinforced plastics are generally resins which can be cured into a hardened condition with low molding pressures, typically less than about 200 p.s.i. and preferably cured at atmospheric pressure. The two most commonly employed systems are based on unsaturated polyester resins or epoxide resins. The polyester resins are copolymers of styrene and unsaturated polyesters and are supplied as a solution of linear unsaturated polyesters in styrene. The base polyesters are prepared by condensing phthalic and/or maleic anhydrides with propylene glycol and some diethylene glycol. The condensation is usually performed without a catalyst and at a temperature of about 200° C. for a period of time of about 10 hours to obtain a product with an acid value of about 30—30 mg. KOH per gram. Water formed during the condensation is distilled from the product and unsaturated polyester so obtained is stabilized with a slight amount of phenol and dissolved in styrene to obtain the viscous liquid which is supplied to the fabricator as a polyester resin. In some resins, a part of the styrene monomer is replaced with methyl methacrylate to give weathering properties to the final product. The polyester resin is blended with a catalyst accelerator in most applications and suitable peroxide catalysts can be used, such as benzoyl peroxide, 1-hydroxycyclohexyl hydro-peroxide-1, etc.

Another commonly used resin system for manufacture of fiber reinforced plastics is epoxide resins. These resins, which are preferred for their greater strength, are obtained by condensing diphenylolpropane with a molar excess of epichlorhydrin in the presence of sodium hydroxide as a catalyst and ethanol solvent. The excess epichlorhydrin and the alcohol solvent are distilled off and the sodium hydroxide is removed by washing. The epoxide resins are obtained as a low-molecular-weight, linear polycondensates. The epoxide resins require a hardening agent to react with the epoxy or hydroxl groups and form a cross-linked hardened resin. Typically, aliphatic polyamines and acid anhydrides are used as hardening agents. The amines most commonly employed are diethylene triamine, triethylene tetramine or tetraethylene pentamine which are employed in amounts comprising from 10 to 15% of the epoxy resin. A typically employed acid anhydride is phthalic anhydride which is used in an amount from 40 to about 50% of the epoxy resin.

Other resins which can be used include polyamide resins and phenolic resins, the former being particularly suited for high temperature applications.

Obviously, many modifications and variations of the present invention may be made with regard to the foregoing detailed description without departing from the spirit of the invention.

What is claimed is:

1. The method for the fabrication of a tubular shaft having a cylindrical center section and opposite radial end flanges secured thereto by frusto-conical fillet sections which comprises:

forming a sheathing of continuous filament wrapping about a mandrel having a cylindrical center section and tapered end sections with removable flange portions by winding filaments of fibrous reinforcing material in a helical path about said mandrel and guiding said filaments in mandrel end-to-end traversing paths to form said sheathing about the mandrel cylindrical center section in a plurality of layers of helically wound filaments thereon at a first helix angle and guiding said windings radially inwardly about the mandrel tapered end sections to form said frusto-conical fillet sections of said sheathing at a greater helix angle and radially outwardly in a chordal path about said flange portions, thereafter reversing the path of said filaments about said flange portions so that said filaments are applied in layers comprising two adjacent thicknesses of filaments in parallel alignment in each thickness and in diagonal orientation between thicknesses;

embedding said layers of wound filaments in a bonding resin;

curing said bonding resin to cement said sheathing into a rigid shaft member;

cutting said cured sheathing about said flange portions of said mandrel; and removing said flange portions to form a tubular shaft having a cylindrical center section and opposite end flanges secured thereto by said frusto-conical fillet sections.

2. The method of claim 1 wherein the cylindrical ceuter section of said mandrel comprises a flexible material and including the step of applying a positive differential pressure internally of said center section as the only provision to maintain said section in a cylindrical form during said winding and said curing of said bonding resin.

3. The method of claim 2 including coating said tapered mandrel sections with a mold release agent prior to the winding of said mandrel with said filaments, and, after said curing of said bonding resin, removing said tapered mandrel sections from said mandrel.

4. The method of claim 3 wherein the remainder of said mandrel is coated with a mold release agent and removed from the interior of said tubular shaft member after said curing step.

5. The method of claim 4 wherein said filaments comprise glass fibers.

6. The method of claim 4 wherein said filaments comprise graphite fibers.

7. The method of claim 5 wherein said bonding resin is an epoxide resin.

8. The method of claim 7 wherein the step of curing the resin coated sheathing is carried out in a mold cavity by heating said sheathing in said mold cavity to a temperature from 75° to 400° F. for a period of 10 minutes to 7 days to cure said resin.

9. The method of claim 1 wherein said filaments are guided and applied to the center section of said mandrel at a helix angle from 5° to about 75°.

10. The method of claim 1 wherein said bonding resin is applied to said filaments by coating said resin on said filaments as the filaments are wound onto said mandrel.

11. The method of claim 1 wherein said filaments are wound onto said mandrel at a tension from 0.1 to 10 pounds per filament.

12. The method of claim 1 including the step of applying additional layers of fibrous reinforcement material over the frusto-conical end sections and end return flanges to provide a tubular shaft having a greater wall thickness at its end flanges and filleted sections between said end flanges and cylindrical portion.

* * * * *